United States Patent [19]

Miller et al.

[11] Patent Number: 5,169,813

[45] Date of Patent: Dec. 8, 1992

[54] DEHYDROCYCLIZATION OR CATALYTIC REFORMING SULFUR TOLERANT ZEOLITE CATALYST

[75] Inventors: Stephen J. Miller, San Francisco; Bernard F. Mulaskey, Fairfax, both of Calif.

[73] Assignee: Chevron Research and Technology Company, San Francisco, Calif.

[21] Appl. No.: 488,332

[22] Filed: Mar. 2, 1990

[51] Int. Cl.$^5$ ............................................. B01J 29/32
[52] U.S. Cl. ........................................ 502/66; 502/62; 502/71
[58] Field of Search ................. 502/66, 74, 207, 71, 502/62

[56] References Cited

U.S. PATENT DOCUMENTS

| | | |
|---|---|---|
| 3,953,365 | 4/1976 | Oishi ................................ 502/74 |
| 4,462,971 | 7/1984 | Hinnenkamp et al. ............. 502/207 |
| 4,517,306 | 5/1985 | Buss ................................. 502/74 |
| 4,552,856 | 11/1985 | Tauster et al. ................... 502/74 |
| 4,619,906 | 10/1986 | Lambert et al. .................. 502/66 |
| 4,725,570 | 2/1988 | Sikkenga et al. ................. 502/207 |

*Primary Examiner*—Carl F. Dees
*Attorney, Agent, or Firm*—W. Keith Turner; Robert D. Touslee

[57] ABSTRACT

A process is provided for catalytic reforming or dehydrocyclization of hydrocarbons using a catalyst comprising a noble metal, and an intermediate pore size crystalline silicate having a high silica to alumina ratio and a relatively low alkali content. Preferably, the crystalline silicate is in the form of small crystallite size, such as less than 5 microns. The reforming or dehydrocyclization process is sulfur tolerant so that the reforming can be carried out in the presence of sulfur or with periodic exposure to sulfur.

17 Claims, No Drawings

DEHYDROCYCLIZATION OR CATALYTIC REFORMING SULFUR TOLERANT ZEOLITE CATALYST

BACKGROUND OF THE INVENTION

The present invention relates to dehydrocyclization and catalytic reforming using a catalyst containing a crystalline silicate.

Dehydrocyclization is a well known reaction wherein alkanes are converted to aromatics. For example, hexane may be dehydrocyclized to benzene.

Catalytic reforming is a very well-known refinery process for upgrading light hydrocarbon feedstocks, frequently referred to as naphtha feedstocks. Products from catalytic reforming can include high octane gasoline, useful as automobile fuel, and/or aromatics, such as benzene and toluene, useful as chemicals. Reactions typically involved in catalytic reforming include dehydrocyclization, isomerization and dehydrogenation.

Thus reforming typically includes dehydrocyclization. However, dehydrocyclization or aromatization of alkanes can be directed more narrowly than reforming.

For a long period of time, the leading catalyst used in reforming was platinum on an alumina-halide support. This catalyst had some sensitivity to sulfur, but modest amounts of sulfur, such as 10 to 100 ppm or so, were acceptable and sometimes preferred.

In the late 1960's and early 1970's, a catalyst was introduced which had more sensitivity to sulfur. This catalyst contained platinum and rhenium, generally on an alumina-halide support. This catalyst was found to perform best at sulfur levels in the feed below 10 ppm, preferably below 1 ppm, see U.S. Pat. No. 3,415,737 to Kluksdahl. The catalyst preferably was sulfided prior to use in catalytic reforming.

More recently, U.S. Pat. No. 4,634,518 to Buss and Hughes discloses a process for catalytic reforming and/or dehydrocyclization/aromatization wherein the catalyst is even more sensitive to sulfur than the platinum rhenium catalyst.

The U.S. Pat. No. 4,634,518 process uses a catalyst such as platinum on a large pore crystalline aluminosilicate zeolite, such as L-zeolite. Preferably, the sulfur is maintained at less than 0.1 ppm in the feed to the aromatics process See U.S. Pat. No. 4,456,527 to Buss, Field and Robinson.

U.S Patent No. 4,835,336 to McCullen discloses sulfiding a noble metal/low acidity medium pore size zeolite catalyst to suppress hydrogenolysis and increase aromatic selectivity of the catalyst. The silica to alumina ratio according to the 336 patent is at least 12. The Example in the '336 patent discloses a silica to alumina ratio of 26,000. The amount of alkali in '336 catalyst is not disclosed in the Example. With regard to inclusion of alkali in the '336 catalyst, the '336 teaches at Column 6, line 9:

The low acidity zeolite (for example, ZSM-5) can be synthesized to have a low aluminum content, or may be exchanged with Group IA or IIA cations to reduce acidity.

At Column 12, line 1, the '336 patent teaches:

The zeolites used as catalysts in this invention may be in the hydrogen form or they may be base exchanged or impregnated to contain ammonium or a metal cation complement. The metal cations that may be present include any of the cations of the metals of Group I through VIII of the periodic table. However, in the case of Group IA metals, the cation content should in no case be so large as to substantially eliminate the activity of the zeolite for the catalysts being employed in the instant invention.

Japanese Kokai 115087, laid open May 26, 1987, discloses the use of a high silica to alumina ratio zeolite for reforming. The catalyst contains a Group IIB metal and is presulfided.

Another reference which discloses the use of zeolitic catalyst in aromatization or dehydrocyclization reactions is U.S. Pat. No. 4,347,394, to Detz and Field. The catalyst disclosed for use in the process of the '394 Detz and Field patent contains a crystalline aluminosilicate which is commonly referred to as silicalite. Silicalite is generally regarded as having the same basic X-ray diffraction pattern as the well-known zeolite ZSM-5. ZSM-5 is disclosed in U.S. Pat. No. 3,702,886 to Argauer. However, the ratio of silica to alumina for silicalite is higher than is the silica/alumina ratio for typical ZSM-5 catalyst.

According to the Detz and Field patent cited above, the sulfur in the feed is low, less than 0.2 ppm for feed 1, as disclosed in Column 5 of that patent, and less than 0.02 ppm for feed 2. Also, the acidity of the catalyst is low, so that the catalyst is referred to as a non-acidic catalyst.

According to the Column 6 examples in the Detz and Field patent, the amount of alkali used in the catalyst is not necessarily low. Thus, Column 6, Experiments A, B and C, show that 0.017 weight percent sodium was too low for achieving good yields of $C_5+$ and of benzene, whereas, at higher sodium amounts improvement was obtained. At 0.99 weight percent sodium in the catalyst, the $C_5+$ yield and benzene yield improved substantially, and at 4.12 weight percent sodium, the improvement was even greater.

As will be seen from the description below, the present invention requires the use of a low alkali catalyst and the catalyst is sulfur tolerant.

U.S Patent No. 4,680,280 to Pandey and Buss discloses the addition of molybdenum to zeolite L catalytic reforming catalyst as a means of improving sulfur tolerance. U.S. Pat. 4,579,831 to Field discloses a sulfur resistant catalyst comprising a zeolite bound with alumina containing an alkali or alkaline earth component.

U.S. Pat. No 4,401,555 to Miller is directed to olefin production from paraffins using silicalite having a low sodium content. The silicalite used in the '555 process contains less than 0.1 weight percent sodium and is composited in a matrix which is substantially free of cracking activity. Also, the composite has no hydrogenation component. According to the '555 process, the feed can be hydrotreated to reduce sulfur to less than 100 ppm organic sulfur.

U.S. Pat. No. 4,851,605 to Bortinger et al. discloses a method of making a zeolite, such as ZSM-5, on a pH controlled sodium free basis. The catalyst of U.S. Pat No. 4,851,605 is used in a process to synthesize olefins from methanol and/or dimethyl ether.

As described below, according to one embodiment of the present invention, the low alkali catalyst of the present invention is used in a "staged catalyst" mode, or in a "staged reforming" mode.

U.S. Pat. No. 4,808,295 to Nemet-Mavrodin discloses a two stage reforming process using a catalyst comprising platinum and a ZSM-5 zeolite with a silica/alumina ratio of about 25 to 1000 in the second stage. In this process, the effluent from the first stage is passed without any intermediate chemical, purification or separation treatment directly to a second stage reaction zone where it is contacted with a second stage catalyst.

SUMMARY OF THE INVENTION

According to the present invention, a process is provided for catalytic reforming of feed hydrocarbons in a reaction zone which may be subjected to periodic exposure to more than 100 ppb sulfur, which process comprises contacting the feed under catalytic reforming conditions with a catalyst comprising:

(a) a noble metal;
(b) an intermediate pore size crystalline silicate having a silica to alumina ratio of at least 200, preferably at least 500; and
(c) a low alkali content, preferably less than 5000 ppm, in the crystalline silicate.

The alkali content is of great importance in the present invention. Among other factors, the present invention is based on our finding that the low alkali content catalyst of the present invention achieves surprisingly low fouling rates or deactivation rates and that such low fouling rates are achieved even after sulfur breakthrough or other periodic exposure of the reforming or dehydrocyclization catalyst to sulfur. Fouling or deactivation rate is the rate at which the reforming or dehydrocyclization zone reaction temperature needs to be raised per unit time, e.g., ° F. per hour, in order to maintain a given product quality, e.g., gasoline octane number.

We have further found that it is advantageous to sulfide the catalyst used in the present invention. The sulfiding can be done by known presulfiding techniques, for example, by passing a gas stream containing hydrogen sulfide over the catalyst prior to commencing the reforming or dehydrocyclization run, or the sulfiding of the catalyst can be carried out through the sulfur in the feed to the process. We have found that, in catalytic reforming, the combination of low alkali in the intermediate pore size crystalline silicate of high silica to alumina ratio and sulfiding of the catalyst allows the achievement of surprisingly good $C_5+$ yields, low fouling rates even after exposure to sulfur, and high octane for product gasoline, especially at the preferred low operating pressures as stated below.

We have found that, for the catalyst used in the process of the present invention, it is advantageous to use small crystallite size intermediate pore size crystalline silicate of high silica to alumina ratio. Small crystallite size for this component of the catalyst is discussed in more detail in our co-pending patent application Ser. No. 97,789, refiled Aug. 22, 1989 as Ser. No. 396,816, (both now abandoned) titled "A Crystalline Silicate Catalyst and A Reforming Process Using the Catalyst". The disclosure of Ser. No. 396,816 is incorporated herein by reference, particularly its disclosure with regard to small crystallite size intermediate pore size crystalline silicates and methods of making such crystallites. Preferred small crystallite sizes for the present invention are less than 10 microns, more preferably less than 5 microns, still more preferably less than 2 microns, and especially preferred less than 1 micron. The size is on a basis of the largest dimension of the crystallites. Preferred shapes for the crystallites are approximately spherical. When a crystallite size is specified, preferably at least 70 wt. % of the crystallites are within the specified range, more preferably at least 80 wt. %, and most preferably at least 90 wt. %.

Thus, according to a preferred embodiment of the present invention, the catalyst used in the reforming process comprises an intermediate pore size crystalline silicate of small crystallite size and having a high silica to alumina ratio and having a low alkali content. According to a particularly preferred embodiment, the catalyst is presulfided or is sulfided during reforming operations.

The crystalline silicate component of the catalyst of the present invention is generally referred to herein as silicate or crystalline silicate, but also is commonly referred to as a zeolite.

The term "alkali" is used herein to mean Group IA metals. Preferred alkali metals for use in the catalyst of the present invention are sodium, potassium, cesium, lithium and rubidium. Sodium and potassium are more preferred. Sodium is the most preferred alkali metal for use in the catalyst.

The amount of alkali must be low, lower than the levels typically taught in the prior art for "non-acidic" catalyst. The amount of alkali will vary depending on the ratio of silica to alumina in the crystalline silicalite component of the catalyst, with less alkali being required as the silica to alumina ratio of the silicate increases. Preferred amounts of alkali for the catalyst where the silica to alumina ratio is 500:1 or greater are less than 6000 ppm, more preferably less than 5000 ppm, and most preferably less than 1500 ppm.

Preferred amounts of the alkali for the crystalline silicate where the silica to alumina ratio is 1000:1 or greater, are less than 5000 ppm, more preferably less than 3000 ppm, and most preferably less than 1000 ppm.

Amounts of alkali are by weight based on the total weight of the crystalline silicate component of the catalyst. The abbreviation ppm indicates parts per million.

The amount of alkali is an amount sufficient to neutralize substantially all of the acidity of the crystalline silicate. Preferred amounts of alkali are between one and ten parts alkali to one part aluminum, more preferably between one and five parts alkali to one part aluminum, on a molar basis, based on the aluminum in the crystalline silicate. Thus, the amount of alkali will vary as a function of aluminum. Typical preferred lower amounts of alkali are 0.01, more typically 0.1 wt. %. In most cases, some alkali is present in the crystalline silicate that cannot be readily ion exchanged out of the silicate on a practical basis. This difficult to exchange alkali can be minimized by selecting appropriate methods of preparing the silicate, for instance, as disclosed in Example 6 hereinbelow. .

The silicate of the catalyst of the present invention preferably is low in acidity, more preferably substantially free of acidity. However, the low acidity silicate, or silicate substantially free of acidity, is, in accordance with the present invention, not achieved by using large amounts of alkali. The low acidity, or substantial nonacidity, may be achieved by a combination of low aluminum content in the silicate and the use of low amounts of alkali and/or the use of alkaline earth metals. The silicate component of the catalyst preferably is included in a matrix or binder to form the finished catalyst, as described hereinbelow. Preferably, the finished catalyst is of low acidity, more preferably substantially free of acidity.

The acidity of the crystalline silicate may be determined as follows: 0.1–1.5 g of silicate is mixed with 1 g of acid-washed and neutralized alundum and packed in a 3/16" stainless steel reactor tube with the remaining space filled with alundum. The reactor contents are calcined for one hour at 450° C. The reactor is then placed in a clam-shell furnace at 427° C. and the reactor outlet connected to the inlet of a gas chromatograph. The inlet is connected to the carrier gas line of the GC. Helium is passed through the system at 30 cc/min. 0.04 Microliter pulses of n-decane are injected through a septum above the reactor and reaction products are determined by standard GC analysis. Blank runs with alundum should show no conversion under the experimental conditions, nor should a 100% Catapal alumina catalyst.

A pseudo-first-order, cracking rate constant, k, is calculated using the formula:

$$k = \frac{1}{A} \ln \frac{1}{1-x}$$

where A is the weight of silicate in grams and x is the fractional conversion to products boiling below decane. The silicate is substantially free of acidity when the value of ln k is less than about $-3.8$. The silicate is low in acidity if ln k is less than about $-2.3$.

The crystalline silicate, as described below, may be a component of the final catalyst, for instance where the final catalyst is a crystalline silicate "bound" in a matrix such as silica or alumina. In such case, the crystalline silicate acidity should be determined by measuring acidity of the crystalline silicate as a separate component.

The acidity of the finished catalyst containing the crystalline silicate may also be assessed as described above.

In accordance with an alternate preferred embodiment of the present invention, an alkaline earth metal (Group IIA metal) is also included in the catalyst. Magnesium, calcium, strontium and barium are preferred Group IIA metals. Magnesium is a more preferred Group IIA metal for use in the catalyst of the present invention. The alkaline earths are advantageously used to reduce the acidity of the catalyst. The alkaline earth metals are not as effective as the alkali metals in reducing acidity, but we have found that the alkaline earth metals do not impart as much sulfur sensitivity to the catalyst as do the alkali metals. In this preferred alternate embodiment alkaline earth metals are included in the crystalline silicate in an amount between 0.1 to 10.0, preferably 0.5 to 5.0, parts of alkaline earth metal per part alkali metal, on a molar basis.

Additionally, the acid sites can advantageously be neutralized with other basic components such as cerium or lanthanum.

An important aspect of the present invention is the sulfur tolerance of the catalyst. Sulfur tolerance is used herein primarily to connote that the catalyst may be exposed to substantial amounts of sulfur, such as more than 2 ppm sulfur, and return to relatively high activity after the exposure to high sulfur levels is discontinued. We have also found that the catalyst of the present invention has a surprising resistance to sulfur poisoning or deactivation in the range of about 0.1 to 2 ppm sulfur. Thus, in addition to the catalyst capability of "bouncing back" in activity after discontinuance of sulfur in the feed, the catalyst also can "resist" or tolerate, as a steady component in the feed, up to 2 ppm sulfur, more preferably up to 1 ppm sulfur, most preferably up to 0.5 ppm sulfur. Accordingly, the terminology "sulfur tolerance" is used herein to embrace the catalyst's capability to regain activity after discontinuance of exposure to sulfur and also the catalyst's ability to perform well (low fouling rate and good activity) in the presence of moderate amounts of sulfur.

The sulfur tolerance can be utilized in various ways. The feed to the process may contain relatively high amounts of sulfur compared to feed to other catalytic reforming or dehydrocyclization processes using zeolitic-based catalysts, or the feed may be subject to periodic exposure to high amounts of sulfur (and hence the reforming zone subject to periodic high amounts of sulfur).

By "periodic exposure" is meant sulfur increases in the feed and hence in the reforming zone, for example, due to upsets in desulfurization steps upstream of the catalytic reforming or dehydrocyclization zone, or breakthroughs or notable rises in the amount of sulfur in the feed due to the upstream sulfur removal steps, or simply due to changes in the base feedstock to the refinery or catalytic reforming zone. "Periodic" exposure is used to connote exposure to the specified sulfur levels for a significant period of time as opposed to continuous exposure to sulfur. A significant period of time would typically be at least 2 minutes, more typically an hour or more.

When reforming or dehydrocyclizing using a highly sulfur sensitive crystalline silicate catalyst, it is necessary to go to substantial expense to reduce the sulfur in the feed to very low levels. Frequently, extensive guard bed and/or sulfur sorbent systems are used. Even in a situation where the sulfur content of the feed to the reforming zone will normally be very low, the catalyst of the present invention is advantageously used as the present catalyst will tolerate exposure to sulfur; that is, the catalyst shows much better activity restoration upon discontinuing the exposure to high sulfur levels. Thus, when using the catalyst of the present invention, the capital cost of a reforming unit can be reduced, as less sulfur guard or sulfur removal equipment is needed to protect the catalytic reforming or dehydrocyclization zone as is the case with other crystalline silicate catalysts.

Although the process of the present invention is found to be a sulfur tolerant process, nonetheless, it is preferred not to subject the catalyst in the reforming or dehydrocyclization zone to gross amounts of sulfur. Thus, preferably the sulfur in the feed is not above about 25 ppm, more preferably not above 10 ppm, and most preferably not above about 2 ppm. Especially preferred sulfur levels are between 0.1 and 1 ppm.

Amounts of sulfur are by weight based on the feed hydrocarbon to the process. Also, the sulfur is calculated on the basis of elemental sulfur, although the sulfur may be in the form of organic sulfur compounds or in the form of hydrogen sulfide.

Preferred feeds for the dehydrocyclization or reforming process of the present invention include alkane or paraffinic rich streams containing hexane or higher boiling alkanes. For example, a preferred feed is a paraffinic rich raffinate obtained from solvent extraction or molecular sieve extraction of paraffins from a mixture of paraffins and aromatics. Another preferred feed is reformate from a reforming zone. The reformate may be a $C_5+$ or $C_6+$ hydrocarbon fraction boiling up to 550° F., more preferably up to 400° F.

The present invention is directed to a reforming process and a dehydrocyclization process as set forth herein. In addition, the present invention is directed to the catalyst, described herein, useful in those processes.

DETAILED DESCRIPTION OF THE INVENTION

As previously described, the present invention uses an intermediate port size crystalline silicate material having a high selica to alumina ratio. One preferred material is silicalite or high ratio silica to alumina form of ZSM-5.

Table 1 below reports the X-ray diffraction pattern for ZSM-5 as given in the Argauer patent U.S. Pat. No. 3,702,886).

TABLE 1

| Interplanar Spacing d(A) | Relative Intensity |
|---|---|
| 11.1 ± 0.2 | s. |
| 10.0 ± 0.2 | s. |
| 7.4 ± 0.15 | w. |
| 7.1 ± 0.15 | w. |
| 6.3 ± 0.1 | w. |
| 6.04 ⎫ ±0.1 | |
| 5.97 ⎭ | w. |
| 5.56 ± 0.1 | w. |
| 5.01 ± 0.1 | w. |
| 4.60 ± 0.08 | w. |
| 4.25 ± 0.08 | w. |
| 3.85 ± 0.07 | v.s. |
| 3.71 ± 0.05 | s. |
| 3.04 ± 0.03 | w. |
| 2.99 ± 0.02 | w. |
| 2.94 ± 0.02 | w. |

Also as reported in the Argauer patent, the values in Table 1 were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. In Table 1, the relative intensities are given in terms of the symbols s.=strong, m.=medium, m.s.=medium strong, m.w. TM medium weak and v.s.=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it had been subjected to thermal treatment.

ZSM-5 is regarded by many to embrace "silicalite" as disclosed in U.S. Pat. No. 4,061,724 to Grose et al. For ease of reference herein, silicalite is referred to as a ZSM-5-type material with a high silica to alumina ratio and is regarded as embraced within the ZSM-5 X-ray diffraction pattern. The silica to alumina ratio is on a molar basis of silica ($SiO_2$) to alumina ($Al_2O_3$).

Various references disclosing silicalite and ZSM-5 are provided in U.S. Pat. No. 4,401,555 to Miller. These references include the aforesaid U.S. Pat. No. 4,061,724 to Grose et al.; U.S. Patent Reissue No. 29,948 to Dwyer et al.; Flanigan et al., Nature, 271, 512–516 (Feb. 9, 1978) which discusses the physical and adsorption characteristics of silicalite; and Anderson et al., J. Catalysis 58, 114–130 (1979) which discloses catalytic reactions and sorption measurements carried out on ZSM-5 and silicalite. The disclosures of these references and U.S. Pat. No. 4,401,555 are incorporated herein by reference, particularly including their disclosures on methods of making high silica to alumina crystalline silicates having an X-ray diffraction pattern in substantial accord with Table 1.

Other crystalline silicates which can be used in the process of the present invention include those as listed in U.S. Pat. No. 4,835,336; namely: ZSM-11, ZSM-12, ZSM-22, ZSM-23, ZSM-35, ZSM-38, ZSM-48, and other similar materials.

ZSM-5 is more particularly described in U.S. Pat. No 3,702,886 and U.S. Pat. Re. 29,948, the entire contents of which are incorporated herein by reference.

ZSM-11 is more particularly described in U.S. Pat. No. 3,709,979 the entire contents of which are incorporated herein by reference. Bibby et al., Nature, 280, 664–665 (Aug. 23, 1979) reports the preparation of a crystalline silicate called "silicalite-2".

ZSM-12 is more particularly described in U.S. Pat. No. 3,832,449, the entire contents of which are incorporated herein by reference.

ZSM-22 is more particularly described in U.S. Pat. Nos. 4,481,177, 4,556,477 and European Pat. No. 102,716, the entire contents of each being expressly incorporated herein by reference.

ZSM-23 is more particularly described in U.S. Pat No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No 4,046,859, the entire contents of which are incorporated herein by reference.

ZSM-48 is more particularly described in U.S. Pat. No 4,397,827 the entire contents of which are incorporated herein by reference.

Of these, ZSM-5, ZSM-11, ZSM-22 and ZSM-23 are preferred. ZSM-5 is most preferred for use in the catalyst of the present invention.

Additionally, zeolites SSZ-20 and SSZ-23 are preferred. SSZ-20 is disclosed in U.S. Pat. No. 4,483,835, and SSZ-23 is disclosed in U.S. Pat. No. 4,859,442, both of which are incorporated herein by reference.

The crystalline silicate may be in the form of a borosilicate, where boron replaces at least a portion of the aluminum of the more typical aluminosilicate form of the silicate Borosilicates are described in U.S. Pat. Nos. 4,268,420; 4,269,813; 4,327,236 to Klotz, the disclosures of which patents are incorporated herein, particularly that disclosure related to borosilicate preparation.

In the borosilicate used in the process and catalyst of the present invention, the preferred crystalline structure is that of ZSM-5, in terms of X-ray diffraction pattern. Boron in the ZSM-5 type borosilicates takes the place of aluminum that is present in the more typical ZSM-5 crystalline aluminosilicate structures. Borosilicates contain boron in place of aluminum, but generally there is some trace amounts of aluminum present in crystalline borosilicates.

Still further crystalline silicates which can be used in the present invention are ferrosilicates, as disclosed for example in U.S. Pat. No. 4,238,318, gallosilicates, as disclosed for example in U.S. Pat. No. 4,636,483, and chromosilicates, as disclosed for example in U.S. Pat. No. 4,299,808.

Thus various high silica content silicates (silicates having a high ratio of silica to other constituents) can be used as the crystalline silicate component of the catalyst of the present invention.

Borosilicates and aluminosilicates are preferred silicates for use in the present invention. Aluminosilicates are the most preferred. Silicalite is a particularly preferred aluminosilicate for use in the catalyst of the present invention.

As synthesized, silicalite (according to U.S. Pat. No. 4,061,724) has a specific gravity at 77° F. of 1.99±0.05 g/cc as measured by water displacement. In the calcined form (1112° F. in air for one hour), silicalite has a specific gravity of 1.70±0.05 g/cc. With respect to the mean refractive index of silicalite crystals, values obtained by measurement of the as synthesized form and the calcined form (1112° F. in air for one hour) are 1.48±0.01 and 1.39±0.01, respectively.

The X-ray powder diffraction pattern of silicalite (1112° F. calcination in air for one hour) has six relatively strong lines (i.e., interplanar spacings). They are set forth in Table 2 ("S"-strong, and "VS"-very strong):

TABLE 2

| d-A | Relative Intensity |
|---|---|
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

Table 3 shows the X-ray powder diffraction pattern of a typical silicalite composition containing 51.9 mols of SiO$_2$ per mol of tetrapropyl ammonium oxide [(TPA)$_2$O], prepared according to the method of U.S. Pat. No. 4,061,724, and calcined in air at 1112° F. for one hour.

TABLE 3

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Silicalite crystals in both the "as synthesized" and calcined forms are generally orthohombic and have the following unit cell parameters: a=20.05 A, b=19.86 A, c=13.36 A (all values ±0.1 A).

The pore diameter of silicalite is about 6Å and its pore volume is 0.18 cc/gram as determined by adsorption. Silicalite adsorbs neopentane (6.2 A kinetic diameter) slowly at ambient room temperature. The uniform pore structure imparts size-selective molecular sieve properties to the composition, and the pore size permits separation of p-xylene from o-xylene, m-xylene and ethyl-benzene as well as separations of compounds having quaternary carbon atoms from those having carbon-to-carbon linkages of lower value (e.g., normal and slightly branched paraffins).

The crystalline silicates of U.S. Pat. No. Re. 29,948 (Reissue of USP 3,702,886 to Argauer) are disclosed as having a composition, in the anhydrous state, as follows:

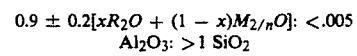

$$0.9 \pm 0.2[xR_2O + (1 - x)M_{2/n}O]: <.005$$
$$Al_2O_3: >1 \text{ SiO}_2$$

where M is a metal, other than a metal of Group IIIA, n is the valence of said metal, R is an alkyl ammonium radical, and x is a number greater than 0 but not exceeding 1. The crystalline silicate is characterized by the X-ray diffraction pattern of Table 1, above.

The crystalline silicate polymorph of U.S. Pat. No. 4,073,865 to Flanigen et al. is related to silicalite and, for purposes of the present invention, is regarded as being in the ZSM-5 class. The crystalline silicate exhibits the X-ray diffraction pattern of Table 4.

TABLE 4

| d(A) | Intensity |
|---|---|
| 11.14 | 91 |
| 10.01 | 100 |
| 9.75 | 17 |
| 8.99 | 1 |
| 8.01 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

According to the August 1979 Nature reference cited above, a silicalite-2 precursor can be prepared using tetra-n-butylammonium hydroxide only, although adding ammonium hydroxide or hydrazine hydrate as a source of extra hydroxyl ions increases the reaction rate considerably. It is stable at extended reaction times in a hydrothermal system. In an example preparation, 8.5 mol $SiO_2$ as silicic acid (74% $SiO_2$) is mixed with 110 mol tetra-n-butylammonium hydroxide, 3.0 mol $NH_4OH$ and 100 mol water in a steel bomb and heated at 338° F. for three days. The precursor crystals formed are ovate in shape, approximately 2–3 microns long and 1–1.5 microns in diameter. It is reported that the silicalite-2 precursor will not form if Li, Na, K, Rb or Cs ions are present, in which case the precursor of the U.S. Pat. No. 4,061,724 silicalite is formed. It is also reported that the size of the tetraalkylammonium ion is critical because replacement of the tetra-n-butylammonium hydroxide by other quaternary ammonium hydroxides (such as tetraethyl, tetrapropyl, triethylpropyl, and triethylbutyl hydroxides) results in amorphous products. The amount of Al present in silicalite-2 depends on the purity of the starting materials and is reported as being less than 5 ppm. The precursor contains occluded tetraalkylammonium salts which, because of their size, are removed only by thermal decomposition. Thermal analysis and mass spectrometry show that the tetraalkylammonium ion decomposes at approximately 572° F. and is lost as the tertiary amine, alkene and water. This is in contrast to the normal thermal decomposition at 392° F. of the same tetraalkylammonium salt in air.

The Nature article further reports that the major differences between the patterns of silicalite and silicalite-2 are that peaks at 9.06, 13.9, 15.5, 16.5, 20.8, 21.7, 22.1, 24.4, 26.6 and 27.0 degrees 28 (CuK alpha radiation) in the silicalite X-ray diffraction pattern are absent from the silicalite-2 pattern. Also, peaks at 8.8, 14.8, 17.6, 23.1, 23.9 and 29.9 degrees are singlets in the silicalite-2 pattern rather than doublets as in the silicalite pattern. These differences are reported as being the same as those found between the aluminosilicate diffraction patterns of orthorhombic ZSM-5 and tetragonal ZSM-11. Unit cell dimensions reported as calculated on the assumption of tetragonal symmetry for silicalite-2 are a=20.04; b =20.04; c =13.38. The measured densities and refractive indices of silicalite-2 and its precursor are reported as 1.82 and 1.98 g/cc and 1.41 and 1.48 respectively.

For purposes of the present invention, silicalite is regarded as being in the ZSM-5 class, alternatively put, as being a form of ZSM-5 having a high silica to alumina ratio; silicalite-2 is regarded as being in the ZSM-11 class.

The preparation of crystalline silicates of the present invention generally involves the hydrothermal crystallization of a reaction mixture comprising water, a source of silica, and an organic templating compound at a pH of 10 to 14. Representative templating moieties include quaternary cations such as XR4 where X is phosphorous or nitrogen and R is an alkyl radical containing from 2 to 6 carbon atoms, e.g., tetrapropylammonium hydroxide (TPA-OH) or halide, as well as alkyl hydroxyalkyl compounds, organic amines and diamines, and heterocycles such as pyrrolidine.

When the organic templating compound (i.e., TPA-OH) is provided to the system in the hydroxide form in sufficient quantity to establish a basicity equivalent to the pH of 10 to 14, the reaction mixture may contain only water and a reactive form of silica as additional ingredients. In those cases in which the pH must be increased to above 10, ammonium hydroxide or alkali metal hydroxides can be suitably employed for that purpose, particularly the hydroxides of lithium, sodium and potassium. The ratio: $R^+$ to the quantity $R^+$ plus $M^+$, where $R^+$ is the concentration of organic templating cation and $M^+$ is the concentration of alkali metal cation, is preferably between 0.7 and 0.98, more preferably between 0.8 and 0.98, most preferably between 0.85 and 0.98.

The source of silica in the reaction mixture can be wholly, or in part, alkali metal silicate. Other silica sources include solid reactive amorphous silica, e.g., fumed silica, silica sols, silica gel, and organic orthosilicates. One commercial silica source is Ludox AS-30, available from Du Pont.

Aluminum, usually in the form of alumina, is easily incorporated as an impurity into the crystalline silicate. Aluminum in the crystalline silicate contributes acidity to the catalyst, which is undesirable. To minimize the amount of aluminum, care should be exercised in selecting a silica source with a minimum aluminum content. Commercially available silica sols can typically contain between 500 and 700 ppm alumina, whereas fume silicas can contain between 80 and 2000 ppm of alumina impurity. As explained above, the silica to alumina molar ratio in the crystalline silicate of the catalyst used in the present invention is preferably greater than 500:1, more preferably greater than 1000:1, most preferably greater than 2000:1.

The quantity of silica in the reaction system is preferably 27 between about 1 and 10 mols $SiO_2$ per mol-ion of the organic templating compound. Water should be generally present in an amount between 20 and 700 mol per mol-ion of the quaternary cation. The reaction preferably occurs in an aluminum-free reaction vessel which is resistant to alkali or base attack, e.g., Teflon.

In forming the final catalyst used in the present invention, the crystalline silicate is preferably bound with a matrix. The term "matrix" includes inorganic compositions with which the silicate can be combined, dispersed, or otherwise intimately admixed. Preferably, the matrix is not catalytically active in a hydrocarbon cracking sense, i.e., contains substantially no acid sites. Satisfactory matrices include inorganic oxides. Preferred inorganic oxides include alumina, silica, naturally occurring and conventionally processed clays, for example bentonite, kaolin, sepiolite, attapulgite and halloysite. Preferred matrices are substantially non-acidic and have little or no cracking activity. Silica matrices and also alumina matrices are especially preferred. We have found that the use of a low acidity matrix, more preferably a substantially non-acidic matrix, is advantageous in the catalyst of the present invention.

Compositing the crystalline silicate with an inorganic oxide matrix can be achieved by any suitable method wherein the silicate is intimately admixed with the oxide while the latter is in a hydrous state (for example, as a hydrous salt, hydrogel, wet gelatinous precipitate, or in a dried state, or combinations thereof). A convenient method is to prepare a hydrous mono or plural oxide gel or cogel using an aqueous solution of a salt or mixture of salts (for example, aluminum sulfate and sodium silicate). Ammonium hydroxide carbonate (or a similar base) is added to the solution in an amount sufficient to precipitate the oxides in hydrous form. Then, the precipitate is washed to remove most of any water soluble salts and it is thoroughly admixed with the silicate which is in a finely divided state. Water or a lubricating agent can be added in an amount sufficient to facilitate shaping of the mix (as by extrusion).

A preferred crystalline silicate for use in the catalyst of the present invention is ZSM-5 having a high silica to alumina ratio, which, for convenience, is frequently referred to herein as "silicalite". Assuming that the only crystalline phase in the silicalite prep is silicalite, the silicalite preferably has a percent crystallinity of at least 80%, more preferably at least 90%, most preferably at least 95%. To determine percent crystallinity, an X-ray diffraction (XRD) pattern of the silicalite is made and the area under the eight major peaks is measured in the angle interval between 20.5 and 25.0 degrees. Once the area under the curve is calculated, it is compared with the area under the curve for a 100% crystalline standard for silicalite.

The preferred crystallite size of the crystalline silicate is less than 10 microns, more preferably less than 5 microns, still more preferably less than 2 microns, and most preferably less than 1 micron. When a crystallite size is specified, preferably at least 70 wt. % of the crystallites are that size, more preferably at least 80 wt. %, most preferably 90 wt. %. Crystallite size can be controlled by adjusting synthesis conditions, as known to the art. These conditions include temperature, pH, and the mole ratios $H_2O/SiO_2$, and $M^+/SiO_2$, where $R^+$ is the organic templating cation and $M^+$ an alkali metal cation. For small crystallite size, i.e., less than 10 microns, typical synthesis conditions are listed below:

|  | Preferred | More Preferred | Most Preferred |
|---|---|---|---|
| Temperature, °F. | 176-392 | 144-356 | 212-302 |
| pH | 12-14 | 12.5-14 | 13-13.5 |
| $H_2O/SiO_2$ | 5-100 | 10-50 | 10-40 |
| $R^+/SiO_2$ | 0.1-1.0 | 0.1-0.5 | 0.2-0.5 |
| $M^+/SiO_2$ | 0.01-0.3 | 0.01-0.15 | 0.01-0.08 |

Other techniques known to the art, such as seeding with silicate crystals, can be used to reduce crystallite size.

The crystalline silicate component of the catalyst of the present invention has an intermediate pore size. By "intermediate pore size" as used herein is meant an effective pore aperture in the range of about 5 to 6.5 Anstroms when the silicate is in the H-form. Crystalline silicates having pore apertures in this range tend to have unique molecular sieving characteristics. Unlike small pore crystalline silicates or zeolites such as erionite, they will allow hydrocarbons having. Some branching into the zeolitic void spaces. Unlike large pore zeolites such as the faujasites, they can differentiate between n-alkanes and slightly branched alkanes on the one hand and larger branched alkanes having, for example, quarternary carbon atoms.

The effective pore size of the crystalline silicates or zeolites can be measured using standard adsorption techniques and hydrocarbonaceous compounds of known minimum kinetic diameters. See Breck, *Zeolite Molecular Sieves*, 1974 (especially Chapter 8) and Anderson et al., J. Catalysis 58, 114 (1979), both of which are incorporated by reference.

Intermediate pore size crystalline silicates or zeolites in the H-form will typically admit molecules having kinetic diameters of 5 to 6 Anstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular zeolite, but do not penetrate as quickly and in some cases, are effectively excluded (for example, 2,2-dimethylbutane is excluded from H-ZSM-5). Compounds having kinetic diameters in the range of 6 to 6.5 Angstroms include: cyclohexane (6.0), m-xylene (6.1) and 1,2,3,4-tetramethylbenzene (6.4). Generally, compounds having kinetic diameters of greater than about 6.5 Angstroms cannot penetrate the pore apertures and thus cannot be adsorbed in the interior of the zeolite. Examples of such larger compounds include: o-xylene (6.8), hexamethylbenzene (7.1), 1,3,5-trimethylbenzene (7.5), and tributylamine (8.1).

The preferred effective pore size range is from about 5.3 to about 6.2 Angstroms. ZSM-5, ZSM-11 and silicalite, for example, fall within this range.

In performing adsorption measurements to determine pore size, standard techniques are used. It is convenient to consider a particular molecule as excluded if it does not reach at least 95% of its equilibrium adsorption value on the zeolite in less than about 10 minutes ($P/Po = 0.5$ 25° C.).

Examples of intermediate pore size zeolites include silicalite and members of the ZSM series such as ZSM-5, ZSM-11, ZSM-12, ZSM-21, ZSM-22, ZSM-23, ZSM-35, ZSM-38, SSZ-20 and SSZ-23.

The catalysts according to the present invention contain one or more noble metals. Preferred metals are rhodium, palladium, iridium or platinum. Palladium, and platinum are more preferred. Platinum is most preferred. The preferred percentage of the noble metal, such as platinum, in the catalyst is between 0.1 wt. % and 5 wt. %, more preferably from 0.3 wt. % to 2.5 wt. %.

Noble metals are preferably introduced into the crystalline silicate by impregnation, occlusion, or exchange in an aqueous solution or exchange in an aqueous solution of an appropriate salt. When it is desired to introduce two Group VIII metals into the crystalline silicate, the operation may be carried out simultaneously or sequentially. Preferably, the Group VIII metal is finely dispersed within, and on, the crystalline silicate.

By way of example, platinum can be introduced by impregnation with an aqueous solution of tetraammineplatinum (II) nitrate, tetraammineplatinum (II) hydroxide, dinitrodiamino-platinum or tetraammineplatinum (II) chloride In an ion exchange process, platinum can be introduced by using cationic platinum complexes such as tetraammineplatinum (II) nitrate or chloride. When platinum is introduced into the silicalite by occlusion, a platinum complex is preferably introduced into the crystalline silicate during its formation.

After platinum impregnation, the catalyst is preferably ammonium exchanged, if necessary, to remove alkali metals.

After the desired metal or metals have been introduced, the catalyst is preferably treated in air, or air diluted with an inert gas, and reduced in hydrogen. Catalysts containing platinum are typically subjected to halogen or halide treatments to achieve or maintain a uniform metal dispersion. Typically, the halide is a chloride compound. The catalysts of our invention can be subjected to similar treatments although the preferred catalyst does not contain chloride in the final form.

The catalyst can be employed in any of the conventional types of catalytic reforming or dehydrocyclization equipment. The catalyst can be employed in the form of pills, pellets, granules, broken fragments, or various special shapes within a reaction zone.

The feed to the reformer or dehydrocyclization zone is preferably a light hydrocarbon or naphtha fraction, preferably boiling within the range of about 70° to 600° F. and more preferably from 120° to 400° F. This can include, for example, straight run naphthas, paraffinic raffinates from aromatic extraction, and $C_6$-$C_{10}$ paraffin-rich feeds, as well as paraffin-containing naphtha products from other refinery processes, such as hydrocracking or conventional reforming. The actual reforming conditions will depend in large measure on the feed used, whether highly aromatic, paraffinic or naphthenic and upon the desired octane rating of the product. The catalyst of the present invention is preferably used to dehydrocyclize acyclic hydrocarbons to form aromatics.

We have found that the catalyst of the present invention has greater stability (for yield and octane maintenance) if the amount of water introduced to the reaction zone is less than 50 ppm by weight, more preferably less than 25 ppm.

In the process of the present invention, the pressure is preferably between 0 psig and 200 psig, more preferably between 0 psig and 100 psig, and most preferably between 25 psig and 75 psig. The liquid hourly space velocity (LHSV) is preferably between about 0.1 to about 20 hr.$^{-1}$ with a value in the range of about 0.3 to about 5 hr.$^{-1}$ being preferred. The temperature is preferably between about 600° F. and about 1100° F., more preferably between 640° F. and 1050° F. As is well known to those skilled in the dehydrocyclization art, the initial selection of the temperature within this broad range is made primarily as a function of the desired conversion level of the acyclic hydrocarbon considering the characteristics of the feed and of the catalyst. Thereafter, to provide a relatively constant value for conversion, the temperature is slowly increased during the run to compensate for the inevitable deactivation that occurs.

In accordance with one embodiment of the present invention, it is not necessary to contact the low alkali catalyst with recycle hydrogen. In this embodiment, the absence of added or recycle hydrogen favors aromatics production and relative activity which increases liquid yield at a given octane.

In accordance with another embodiment of the present invention, some hydrogen is recycled. This increases catalyst life and conserves heat.

The preferred recycle hydrogen to fresh feed hydrocarbon mole ratio is generally between 0 and 10, more preferably 0 to 5, most preferably 0 to 1. In accordance with the embodiment wherein hydrogen is recycled, the preferred ranges are as stated except with a lower limit of 0.1 recycle hydrogen to fresh feed hydrocarbon mole ratio.

We have found that the low alkali catalysts of the present invention achieve particularly good selectivity to $C_5$+liquids in reforming or dehydrocyclization if they are presulfided prior to use in reforming or dehydrocyclization. The sulfiding of the catalyst can be carried out in situ (in the reforming or dehydrocyclization reactor or reactors) or ex situ. Preferably, the sulfiding is carried out in situ. Sulfiding techniques known in the art are suitable.

In the reforming process embodiment of the present invention, the hydrocarbon feed is contacted with the catalyst as described above in a reforming zone or reforming reactor under reforming conditions. This contacting can be accomplished by using the catalyst in a fixed-bed system, a moving bed system, a fluidized system or in a batch-type operation; however, it is preferred to use either a fixed-bed system or a dense phase moving bed system.

In a fixed-bed system, typically the hydrocarbon feed is preheated to the desired reaction temperature and then passes into a reforming zone containing a fixed-bed of the catalyst It is well known that reforming is typically carried out in a series of reactors or train of reactors. The process of the present invention can comprise the use of the catalyst as described above in one or more of the reactors in a series of reforming reactors or in a reforming zone which is simply a part of the overall train of reactors used in a reforming unit.

According to a preferred embodiment of the present invention, the catalyst of the present invention is disposed in the final stage reactor of a reforming unit which comprises a series of reactors. For example, the catalyst of the present invention may be disposed in the final reactor of a series of two, preferably three or four, reactors, with other reforming catalyst, such as conventional reforming catalyst, being located in the first reactor, preferably in the first two or three reactors. These reactors may be operated at the same or different pressures, and with or without interstage separation and with or without separate hydrogen rich gas recycle systems.

In accordance with another preferred embodiment of the present invention, which may be referred to as a "staged catalyst" mode, substantially the same pressure is used in both a penultimate reforming stage and in the final reforming stage and the low alkali catalyst of the present invention is used in the final stage. Although there may be more than two stages in this embodiment, for present purposes only, the last two stages will be considered. Both stages preferably are run without intermediate separation and substantially without a change in pressure. There will, of course, be some pressure drop through the equipment and catalyst beds. With this mode of operation, we have found particularly advantageous results in terms of yield of high octane product and yield stability when using the low alkali catalyst as described herein. In this embodiment, the two stages can be included, if desired, sequentially within a single reforming reactor vessel. Furthermore, even if the two stages are in separate reformer reactors, intermediate separation preferably is omitted, and preferably intermediate pressurization or depressurization is omitted. The feed to the final stage is the reformate from the penultimate stage.

The feed to the penultimate reformer or dehydrocyclization stage preferably is a light hydrocarbon or naphtha fraction, as described above.

In accordance with this preferred embodiment of the present invention, the pressure in each reforming stage is substantially the same and is preferably between 0 psig and 300 psig, more preferably between 100 psig and 300 psig, and most preferably between 150 psig and 250 psig. The term "substantially" is used to connote pressures differing essentially only due to pressure drop. Thus the pressure differential between stages preferably is less than 20 psi, more preferably less than 10 psi. Preferably in this embodiment is no separation of hydrogen or hydrogen sulfide from hydrocarbons between the reforming stages. The liquid hourly space velocity (LHSV) in the penultimate reforming stage is preferably between about 0.1 to about 10 hr.$^{-1}$ with a value in the range of about 0.3 to about 5 hr.$^{-1}$ being preferred. In the final reforming stage, the LHSV is preferably in the range from about 0.5 to about 10 hr.$^{-1}$. The temperature in the penultimate reforming stage is preferably between about 600° F. and about 1100° F., more preferably between 640° F. and 1050° F. In the final reforming stage, the temperature is preferably between about 700° F. and 1100° F. Staged catalyst mode reforming is described in commonly assigned patent application Ser. No. 07/488,333, filed Mar. 2, 1990, (U.S. Pat. No. 5,073,250) titled "Staged Catalyst Reforming to Produce Optimum Octane Barrel per Calendar Day Reformate Production", the disclosure of which is incorporated herein by reference.

According to still another preferred embodiment of the present invention, which may be referred to as "staged reforming" mode, a light hydrocarbon or naphtha fraction as described above is contacted with a conventional reforming catalyst in a first reforming zone or stage under reforming conditions to produce a reformate. Hydrogen and H$_2$S are separated from the reformate, and then the reformate is contacted with the catalyst of the present invention in a second reforming zone or stage at the same or preferably lower pressure. Preferred operating conditions in the second stage are at a temperature between 550° F. and 1200° F., a space velocity between 0.1 and 20 LHSV, and a pressure between 0 and 200 psig. The hydrogen recycle ratio is between 0 and 5, more preferably between 0 and 1.

Preferably, the conventional reforming catalyst used in the first reforming zone comprises a Group VIII metal, more preferably a noble metal, most preferably platinum. Preferably, the conventional reforming catalyst also comprises a promoter metal, such as rhenium, tin, germanium, cobalt, nickel, iridium, rhodium, ruthenium, or combinations thereof. More preferably, the promoter metal is rhenium or tin. These metals are disposed on a support. Preferable supports include alumina, silica/alumina, silica, natural or man-made zeolites, more preferably, the support is alumina. The catalyst may also include between 0.1 and 3 weight percent chloride, more preferably between 0.5 and 1.5 weight percent chloride. The catalyst, if it includes a promoter metal, suitably includes sufficient promoter metal to provide a promoter to platinum ratio between 0.5:1 and 10:1, more preferably between 1:1 and 6:1, most preferably between 2:1 and 3:1. The precise conditions, compounds, and procedures for catalyst manufacture are known to those persons skilled in the art. Some examples of conventional catalysts are shown in U.S. Pat. Nos. 3,631,216; 3,415,737; and 4,511,746, which are hereby incorporated by reference in their entireties.

The catalyst used in the second zone or stage in this staged reforming process is the low alkali metal intermediate pore size crystalline silicate catalyst of the present invention.

Preferably this above described second stage is the final stage reactor. Staged reforming mode reforming is described in commonly assigned patent application Ser. No. 07/488,156, filed Mar. 2, 1990, (now abandoned) titled "Multi-Stage Reforming Process", the disclosure of which is incorporated herein by reference.

According to a preferred embodiment of the present invention, small amounts of sulfur are fed to the final reactor containing the catalyst of the present invention to improve catalytic selectivity. This is particularly advantageous in many embodiments when the sulfur in the hydrocarbon feed is below about 0.1 ppm. In general, it is important to reform at low sulfur levels. Preferably the sulfur feed level is below 5 ppm, more preferably below 2 ppm, and especially preferred sulfur levels are between 0.1 and 1 ppm.

The feed hydrocarbons to the reforming or dehydrocyclization reaction zone may be contacted with the catalyst in either upward, downward or radial flow fashion. In addition, the hydrocarbon may be in liquid phase or in mixed liquid-vapor phase or vapor phase when it contacts the catalyst, with best results usually being obtained in vapor phase.

EXAMPLES

Example 1

A Pt-impregnated silicalite catalyst was made as follows: 80 g of NaNO$_3$ and 8.3 g of H$_3$BO$_3$ were dissolved in 80 g of distilled water. To this was added 1000 g of a 25% aqueous solution of tetrapropylammonium hydroxide (TPA-OH) and an additional 800 g of distilled water. This was mixed with rapid stirring for 10 minutes. 200 g of Cab-O-Sil grade M-5 silica was added with rapid stirring and mixed an additional 10 minutes. The pH of the mixture was 12.8. The composition of the mixture, expressed in molar ratio of oxides, was: (TPA)$_2$O:0.76 Na$_2$O:0.11 B$_2$O$_3$:5.42 SiO$_2$:147 H$_2$O.

The mixture was then poured into a Teflon bottle and kept at 90° C. for seven days. The product was filtered, dried overnight at 110° C. in a vacuum oven, and then calcined for 8 hours at 538° C. The percent silicalite was 100% as determined by X-ray diffraction analysis. The calcined sieve had a SiO$_2$/Al$_2$O$_3$ molar ratio of about 5000. The sieve contained 1.6 wt. % Na and 0.24 wt. % B.

The sieve, which had an average crystallite size of about 0.4 microns in diameter (roughly spherical), was then impregnated with 0.8 wt. % Pt by the pore-fill method using an aqueous solution of Pt (NH$_3$)$_4$ (NO$_3$)$_2$. The catalyst was then dried overnight in a vacuum oven at 110° C. and calcined in dry air for 4 hours at 204° C., 4 hours at 260° C., and 4 hours at 288° C.

The calcined catalyst was exchanged twice with a 25% aqueous solution of ammonium acetate at 82° C. The catalyst was then dried overnight in a vacuum oven at 110° C., and calcined in dry air for 4 hours at 177° C., 4 hours at 232° C., and 4 hours at 260° C. The final catalyst contained 0.22 wt. % B and 92 ppm Na, as measured by atomic spectroscopy using an inductively coupled plasma detection technique.

Example 2 (Comparative)

A Pt-impregnated silicalite catalyst was made as follows: 11.5 g of NaNO$_3$ were dissolved in 50 g of distilled water.

To this was added 500 g of a 25% aqueous solution of TPA-OH and mixed with rapid stirring for 10 minutes. 5 g of H$_3$BO$_3$ were added and mixed. Then 400 g of Ludox AS-30 (30% silica) were added with rapid stirring and mixed for 15 minutes. The pH of the mixture was 13.2. The composition of the mixture, expressed in molar ratio of oxides, was: (TPA)$_2$O:0.22 Na$_2$O:0.13 B$_2$O$_3$:6.49 SiO$_2$:127 H$_2$O.

The mixture was poured into a Teflon bottle and kept at 90° C. for five days. The product was filtered, dried overnight at 110° C. in a vacuum oven, and then calcined for 8 hours at 538° C. The percent silicalite was 100% as measured by XRD analysis. The resulting calcined sieve had an average crystallite size of about 0.3 micron, and contained 0.96 wt % Na, 0.19 wt. % B, and 800 ppm Al (1100 molar $SiO_2/Al_2O_3$).

The sieve was then impregnated with 0.8 wt. % Pt, dried, and calcined as in Example 1.

Example 3

The following catalysts were prepared:
(a) The catalyst of Example 1.
(b) The catalyst of Example 1 impregnated with 0.05% Na.
(c) The catalyst of Example 1 impregnated with 0.15% Na.

The above catalysts were used to reform a 90.7 RON reformate (Table I) to 101 RON at 50 psig, 1 LHSV, and 1 $H_2$/HC, with the reactor temperature adjusted to achieve the required research octane number (RON). The catalysts were tested both unsulfided and sulfided. Here and in the following examples sulfiding was carried out by injecting $H_2S$ into a $H_2$ stream to the catalyst bed prior to contacting the catalyst bed with hydrocarbon feed. The $H_2S$ injection was continued until sulfur was detected in the exit gas from the catalyst bed.

Table IIa shows that although Na addition had only a small effect on unsulfided activity, it had a much larger effect on sulfided catalyst activity. The product distributions (Table II) all show an improvement in $C_{5+}$ liquid yield upon sulfiding and a decrease in gas make. Thus, it is found that low sodium content is particularly advantageous with sulfided catalysts.

TABLE I

| Reformate feed | |
| --- | --- |
| Gravity, °API | 49.2 |
| Sulfur, ppm | 0.05 |
| Octane, RON | 90.7 |
| P/N/A, LV % | 42.1/6.3/51.5 |
| Composition, LV % | |
| $C_5$ | 7.2 |
| $C_6$ | 11.1 |
| $C_7$ | 18.2 |
| $C_8$ | 30.9 |
| $C_9$ | 26.7 |
| $C_{10}$ | 5.7 |
| D86 Distillation, LV %, °F. | |
| 5/10 | 176/194 |
| 20/30 | 209/231 |
| 50 | 279 |
| 70/90 | 290/333 |
| 95/EP | 357/393 |

TABLE IIa

Effect of Na on Pt/Silicalite for Reforming to 101 RON at 50 psig, 1 LHSV and 1 $H_2$/HC

| | Temperature, °F. | |
| --- | --- | --- |
| Na, Wt. % | Unsulfided Catalyst | Sulfided Catalyst |
| 0.01 | 745 | 790 |
| 0.05 | 745 | 832 |
| 0.15 | 748 | 850 |

TABLE II

Reforming 90.7 RON Reformate to 101 RON at 50 psig, 1 LHSV, and 1 $H_2$/HC

| Catalyst | Pt-B/ Silicalite Ex 3a | | Pt-B/ Silicalite + 0.05% Na Ex 3b | | Pt-B/ Silicalite + 0.15% Na Ex 3c | |
| --- | --- | --- | --- | --- | --- | --- |
| Sulfided | No | Yes | No | Yes | No | Yes |
| Temperature, °F. | 747 | 790 | 745 | 835 | 750 | 850 |

TABLE II-continued

Reforming 90.7 RON Reformate to 101 RON at 50 psig, 1 LHSV, and 1 $H_2$/HC

| Catalyst | Pt-B/ Silicalite Ex 3a | | Pt-B/ Silicalite + 0.05% Na Ex 3b | | Pt-B/ Silicalite + 0.15% Na Ex 3c | |
| --- | --- | --- | --- | --- | --- | --- |
| Yields, Wt. % | | | | | | |
| $C_1$ | 3.46 | 0.87 | 3.08 | 1.46 | 3.14 | 1.53 |
| $C_2$ | 3.91 | 1.31 | 3.84 | 1.68 | 3.93 | 1.48 |
| $C_3$ | 4.36 | 2.98 | 4.55 | 2.65 | 4.98 | 2.13 |
| $IC_4$ | 0.88 | 0.93 | 0.82 | 0.58 | 0.97 | 0.51 |
| $nC_4$ | 4.00 | 3.08 | 4.15 | 2.61 | 4.51 | 2.28 |
| I/n $C_4$ Ratio | 0.22 | 0.30 | 0.20 | 0.22 | 0.22 | 0.22 |
| Sum $C_4$ | 4.88 | 4.01 | 4.97 | 3.19 | 5.48 | 2.79 |
| $C_{5+}$ | 83.4 | 90.8 | 83.6 | 91.0 | 82.5 | 92.1 |

Example 3A (Comparative)

A high-Na Pt-impregnated silicalite catalyst was prepared in a manner similar to that of Example 1 but without a final $NH_4^+$ exchange, so that the Na content was 1.6 wt. %. This catalyst and that of Example 2 were used to reform the 90.7 RON reformate of Table I to 101 RON at the same conditions as in Example 3. The catalysts were tested both unsulfided and sulfided as in Example 3.

Unsulfided product distributions are given in Table III. With both catalysts after sulfiding, 101 RON could not be reached even at 980° F.

TABLE III

Reforming 90.7 RON Reformate to 101 RON at 50 psig, 1 LHSV, and 1 $H_2$/HC over High-Na Pt-B/Silicalite

| Catalyst | Comparative Example 2 | Comparative Example 3A |
| --- | --- | --- |
| Sulfided | No | No |
| Temperature, °F. | 790 | 810 |
| Yields, Wt. % | | |
| $C_1$ | 3.15 | 3.25 |
| $C_2$ | 1.56 | 1.83 |
| $C_3$ | 1.25 | 1.52 |
| $IC_4$ | 0.32 | 0.43 |
| $nC_4$ | 1.68 | 1.96 |
| I/n $C_4$ Ratio | 0.19 | 0.22 |
| Sum $C_4$ | 2.00 | 2.39 |
| $C_{5+}$ | 92.0 | 91.0 |

Example 4

Another Pt-impregnated silicalite catalyst was made as follows: 18.4 of $NaNO_3$ and 40 g of EDTA were dissolved in 80 g of distilled water. To this was added 800 g of a 25% aqueous solution of TPA-OH and mixed for 15 minutes. Then 640 g of Ludox AS-30 were added with rapid stirring and mixed for an additional 15 minutes. The pH of the mixture was 13.2. The composition of the mixture (excluding the EDTA), expressed in molar ratio of oxides, was: $(TPA)_2O$:0.22 $Na_2O$:6.50 $SiO_2$:125 $H_2O$.

The mixture was then poured into a Teflon bottle and kept at 100° C. for seven days. The product was filtered, dried overnight at 110° C. in a vacuum oven, and then calcined for 8 hours at 538° C. The percent silicalite was 100% as determined by XRD analysis. The calcined sieve had an average crystallite size of about 0.3 micron, and contained 780 ppm Al (1100 molar $SiO_2/Al_2O_3$) and 2.1% Na.

The sieve was then impregnated with 0.8 wt. % Pt by the 10 pore-fill method using an aqueous solution of Pt $(NH_3)_4 (NO_3)_2$. The catalyst was then dried overnight in a vacuum oven at 110° C. and calcined in dry air at 427° C. for 8 hours.

The calcined sieve was then $NH_4^+$-exchanged, dried, and calcined as in Example 1. The sieve was then impregnated with 0.06 wt. % Na by the pore-fill method using an aqueous 17 solution of $NaNO_3$. The sieve was then dried overnight in a vacuum oven at 110° C. and calcined for 2 hours at 204° C. Na content of the final catalyst was 0.08 wt. %. The final catalyst had a Na/Al mole ratio of about 1.

Example 5

The catalyst of Example 4 was used to reform the 90.7 RON reformate of Table I to 101 RON at 50 psig, 1 LHSV, and a hydrogen to fresh feed hydrocarbon ($H_2$/HC) ratio of 1. The catalyst was tested both unsulfided and sulfided. The results given in Table IV show an improvement in $C_5+$ yield when the catalyst is sulfided and a high $C_5+$ yield for a Na/Al ratio of 1.

TABLE IV

Reforming 90.7 RON Reformate to
101 RON at 50 psig, 1 LHSV, and 1 $H_2$/HC
over Pt/Silicalite of Example 4

| Sulfided | No | Yes |
|---|---|---|
| Temperature, °F. | 780 | 830 |
| Yields, Wt. % | | |
| $C_1$ | 2.82 | 0.61 |
| $C_2$ | 2.17 | 0.70 |
| $C_3$ | 3.92 | 3.19 |
| $IC_4$ | 2.79 | 1.98 |
| $nC_4$ | 4.03 | 3.03 |
| I/n $C_4$ Ratio | 0.69 | 0.65 |
| Sum $C_4$ | 6.82 | 5.01 |
| $C_5+$ | 84.3 | 90.4 |

Example 6

Another Pt-impregnated silicalite catalyst was made as follows: 1 g of $NaNO_3$ was dissolved in 20 g of distilled water. To this was added 288 g of a 20% aqueous solution of TPA-OH with mixing. Then 166 g of Ludox As-30 were added with rapid stirring and mixed for 10 minutes. The pH of the mixture was 13.2. The composition of the mixture, expressed in molar ratio of oxides, was: $(TPA)_2O:0.051 \ Na_2O:7.09 \ SiO_2:174 \ H_2O$.

The mixture was then poured into a Teflon bottle and kept at 100° C. for seven days. The product was filtered, dried overnight at 110° C. in a vacuum oven, and calcined for 8 hours at 538° C. The percent silicalite was 100% as determined by XRD analysis. The calcined sieve had an average crystallite size of about 0.3 micron, and contained 800 ppm Al (1100 molar $SiO_2/Al_2O_3$) and 0.39 wt. % Na.

The sieve was then impregnated with 0.8 wt. % Pt, dried, and calcined as in Example 1.

Example 7

The catalyst of Example 6 was used to reform the 90.7 RON reformate of Table I to 101 RON at 50 psig, 1 LHSV, and 1 $H_2$/HC. The catalyst was sulfided with $H_2S$ prior to contact with feed. A 101 RON was obtained at 790° F. with a $C_5+$ yield of 88.3 wt. %.

Example 8

Another Pt-impregnated silicalite catalyst (0.1 wt. % Al) was prepared similar to that of Example 6, but was $NH_4^+$-exchanged and then impregnated with 0.37 wt. % Na (to 0.38 wt. % total Na) prior to Pt impregnation. This catalyst was used to reform the 90.7 RON reformate of Table I to 101 RON at 150 psig, 2 LHSV, and 3 $H_2$/HC. The catalyst was sulfided with $H_2S$ prior to contact with feed. A 101 RON was obtained at 920° F. with a $C_5+$ yield of 77.0 wt. %.

Example 9

Another Pt-impregnated silicalite catalyst was prepared from the same sieve as used in Example 8, except that the sieve was impregnated with 0.9 wt. % Na (to 0.9 wt. % total Na) prior to Pt impregnation. This catalyst was used to reform the 90.7 RON reformate of Table I to 101 RON at the same conditions as in Example 8 and also with pre-sulfiding. A 101 RON could not be achieved, even at 980° F.

Example 10

Another Pt-impregnated silicalite catalyst was prepared identical to that of Example 8, with the exception that the sieve was impregnated with 0.3 wt. % Na prior to Pt impregnation. Following calcination of the Pt-impregnated sieve, the catalyst was impregnated with an additional 0.07 wt. % Na to bring the total Na to 0.38 wt. %, dried for 8 hours in a vacuum oven at 120° C., then calcined in dry air at 149° C. for 2 hours, 204° C. for 2 hours, and 260° C. for 4 hours. This catalyst was used to reform the 90.7 RON reformate of Table I to 101 RON at the same conditions as in Example 3 and also with pre-sulfiding. The results (Table V) show the same activity as the sulfided catalyst of Example 8 but increased $C_5+$ yield when the catalyst sodium content is adjusted after platinum inpregnation.

TABLE V

Reforming 90.7 RON Reformate to
101 RON at 150 psig, 2 LHSV, and 3 $H_2$/HC
over Sulfided Pt/Silicalite

| Catalyst | 0.38% Na (Ex. 8) | 0.9% Na (Ex. 9) | 0.38% Na (Ex. 10) | 0.3% Na — 0.3% Mg (Ex. 11) |
|---|---|---|---|---|
| Temperature, °F. | 920 | Too High | 920 | 945 |
| Yields, Wt. % | | | | |
| $C_1$ | 4.05 | | 2.16 | 1.90 |
| $C_2$ | 4.76 | | 2.47 | 2.04 |
| $C_3$ | 6.93 | | 3.84 | 3.51 |
| $IC_4$ | 1.65 | | 0.88 | 1.00 |
| $nC_4$ | 5.66 | | 3.68 | 3.30 |
| $I/nC_4$ | 0.29 | | 0.24 | 0.30 |
| Sum $C_4$ | 7.31 | | 4.56 | 4.30 |
| $C_5+$ | 77.0 | | 8.70 | 88.3 |

Example 11

Another Pt-impregnated silicalite catalyst was prepared identical to that of Example 10, with the exception that after Pt-impregnation and calcination the catalyst was impregnated with 0.3 wt. % Mg using an aqueous solution of Mg $(NO_3)_2$, dried in a vacuum oven for 8 hours at 120° C., then calcined in dry air at 149° C. for 2 hours, 204° C. for 2 hours, and 260° C. for 4 hours. The finished catalyst contained 0.3 wt. % Na and 0.3 wt. % Mg. This catalyst was presulfided and used to reform the 90.7 RON reformate of Table I to 101 RON at the same conditions as in Example 8. The results (Table V) show a 101 RON at 945° F. with a $C_5+$ yield of 88.3 wt. %.

Example 12

The catalyst of Example 11 was also tested for reforming the 90.7 RON reformate of Table I to 101 RON at 50 psig, 1 LHSV, and 1 (hydrogen/hydrocarbon molar ratio) ($H_2$/HC), with pre-sulfiding. A 101 RON was obtained at 865° F. with a $C_5$+ yield of 96.3 wt. %. This experiment shows the desirability of low pressure and low $H_2$/HC ratios.

Example 13

Another Pt-impregnated silicalite catalyst was prepared similar to that of Example 11, except that the average crystallite size of the sieve was about 3 micron instead of 0.3 micron. This catalyst was tested for reforming the 90.7 RON reformate of Table I at the same conditions as in Example 12. A 101 RON required a temperature of 950° F., 85° F higher than needed for the catalyst of Example 11, demonstrating the advantage found for small crystallite size in combination with low alkali content.

Example 14

Another Pt-impregnated silicalite catalyst was made as in Example 6, with the exception that catalyst was exchanged once with 10 wt. equivalents of a 5% Mg acetate solution, dried in a vacuum oven overnight at 110° C., and calcined for two hours at 204° C. The Na content of the finished catalyst was less than 0.4 wt. %, and the Mg content was 0.2 wt. %. The catalyst was used to reform the 90.7 RON reformate of Table I to 101 RON at 150 psig, 2 LHSV, and 3 $H_2$/HC, with pre-sulfiding. With fresh catalyst (one hour onstream), a catalyst temperature of 832° F. was required for 101 RON product. After 117 hours onstream, the catalyst had not lost more than 2° F. in activity and less than 1° F. activity was lost over the last 100 hours of the run, demonstrating the high stability of the catalyst.

Example 15

The catalyst of Example 1 was tested for reforming the 90.7 RON reformate of Table I at 70 psig, 3 LHSV, and 1.0 $H_2$/HC After sulfiding, catalyst temperature was adjusted to maintain a RON of 101.5. At 500 hours onstream, this temperature was 869° F. At 2400 hours, it was 878° F., showing the fouling rate to be only 0.005° F./hr. At 2400 hours, 0.5 ppm S was added to the feed, causing an activity loss of 15° F. but a $C_5$+ yield gain from 87.0 LV% to 87.8 LV%. After 350 hours of sulfur addition, normal operation was resumed. Within 50 hours, catalyst activity and selectivity returned to what it was prior to sulfur addition.

Example 16

Two hundred grams of a bound silicalite extrudate, prepared from an ammonium exchanged silicate powder with a silica/alumina ratio greater than 500, was re-exchanged with 1000 ml of a 0.33 molar sodium hydroxide solution.

After drying and calcinating at 800° F., the 200 grams of whole extrudate was further treated with 400 ml of an aqueous solution of tetraammineplatinum (II) chloride and sodium hydroxide containing 0.005 grams of Pt per ml of solution and 0.166 moles/liter of sodium hydroxide to produce a catalyst containing sodium and platinum disposed on a molecular sieve.

The dried catalyst was calcined to 800° F. to produce a finished strong whole extrudate containing 0.894 wt. % of uniformly distributed platinum. 20 grams of this catalyst was then post-exchanged with three 200 ml 10 wt. % ammonium acetate solutions followed by three water washes to remove the exchangeable alkali on the catalyst and produce a low alkali catalyst. Each of these contactings was for at least one day at room temperature.

Analysis of the exchange solutions showed that 1.67 wt. % Na was removed by the first exchange, 0.113 wt. % was removed by the second, and 0.037 wt. % was removed by the third ammonium acetate exchange. The three subsequent water washes removed less than an additional 0.01 wt. % Na to give a total exchangeable Na content of 1.82 wt. % Na.

Example 17

Two hundred grams of a bound silicalite extrudate, prepared from an ammonium exchanged silicate powder with a silica/alumina ratio greater than 500, was re-exchanged with 1000 ml of 0.33 molar sodium hydroxide solution.

After drying and calcinating at 800° F., 80 grams of the whole extrudate was exchanged with 160 ml of an aqueous solution of tetraammineplatinum (II) chloride and sodium hydroxide, which contained 0.01 grams of Pt per ml of solution and was 0.166 molar in sodium hydroxide, to produce a catalyst containing sodium and platinum disposed on a molecular sieve.

The dried catalyst was calcined to 800° F. to produce a finished strong whole extrudate containing 1.65 wt. % of uniformly distributed platinum. 10 grams of this catalyst was subsequently post-exchanged with three 200 ml 10 wt % ammonium acetate solutions followed by three water washes to reduce the exchangeable alkali on the catalyst. Each of these contactings was for at least one day at room temperature.

Analysis of the exchange solutions showed that 1.65 wt. % Na was removed by the first exchange, 0.108 wt. % was removed by the second, and 0.03 wt. % was removed by the third ammonium acetate exchange. The three subsequent water washes removed less than an additional 0.01 wt. % Na to give a total exchangeable Na content of 1.79 wt. % Na. After drying and calcining, the catalyst was analyzed by ICP for sodium. Results indicated a residual sodium content of 0.453 wt. % non-exchangeable sodium.

What is claimed is:

1. A reforming or dehydrocyclization catalyst which comprises:
    (a) platinum or palladium;
    (b) an intermediate pore size crystalline silicate having a silica to alumina mole ratio of at least 500 and crystallite size less than 10 microns; and
    (c) an alkali content of less than 6000 ppm in the crystalline silicate.

2. A catalyst in accordance with claim 1 wherein the silica to alumina mole ratio is at least 1000.

3. A catalyst in accordance with claim 1 wherein the crystalline size is less than 5 microns.

4. A catalyst in accordance with claim 2 where the alkali is less than 5000 ppm.

5. A catalyst in accordance with claim 3 wherein (a) is platinum, the crystalline silicate is ZSM-5, and the alkali is sodium.

6. A catalyst in accordance with claim 3 wherein the silicate contains magnesium or calcium.

7. A catalyst in accordance with claim 3 wherein the alkali to aluminum ratio in the silicate is between 1 and 5 or a molar basis.

8. A catalyst in accordance with claim 3 wherein the silicate is a borosilicate.

9. A catalyst in accordance with claim 1, wherein the silicate is a borosilicate, a ferrosilicate, a gallosilicate or a chromosilicate.

10. A reforming or dehydrocyclization catalyst which comprises:
   (a) platinum or palladium;
   (b) an intermediate pore size crystalline silicate having a silica to alumina mole ratio of at least 500 and crystallite size less than 10 microns; and
   (c) an alkali content of less than 6000 ppm in the crystalline silicate.

11. A catalyst in accordance with claim 10 wherein the silica to alumina mole ratio is at least 1000.

12. A catalyst in accordance with claim 10 wherein the crystallite size is less than 5 microns.

13. A catalyst in accordance with claim 11 where the alkali is less than 5000 ppm.

14. A catalyst in accordance with claim 12 wherein (a) is platinum, the crystalline silicate is ZSM-5, and the alkali is sodium.

15. A catalyst in accordance with claim 12 wherein the silicate contains magnesium or calcium.

16. A catalyst in accordance with claim 12 wherein the alkali to aluminum ratio in the silicate is between 1 and 5 or a molar basis.

17. A catalyst in accordance with claim 12 wherein the silicate is a borosilicate.

* * * * *